United States Patent
Niiho

[11] 4,003,029
[45] Jan. 11, 1977

[54] INFORMATION SEARCH SYSTEM
[75] Inventor: Masaaki Niiho, Tokyo, Japan
[73] Assignee: Asahi Kogaku Kogyo Kabushiki Kaisha, Tokyo, Japan
[22] Filed: Dec. 18, 1974
[21] Appl. No.: 533,904

Related U.S. Application Data
[63] Continuation-in-part of Ser. No. 495,601, Aug. 9, 1974, which is a continuation of Ser. No. 312,148, Dec. 4, 1972.

[52] U.S. Cl. .................................. 340/172.5
[51] Int. Cl.² ................................. G06F 7/22
[58] Field of Search ............... 340/172.5; 445/1

[56] References Cited
UNITED STATES PATENTS

| | | | |
|---|---|---|---|
| 3,293,615 | 12/1966 | Mullery et al. | 340/172.5 |
| 3,512,134 | 5/1970 | Packard | 340/172.5 |
| 3,538,503 | 11/1970 | Jitsukawa et al. | 340/172.5 |
| 3,568,155 | 3/1971 | Abraham et al. | 340/172.5 |
| 3,601,808 | 8/1971 | Vlack | 340/172.5 |
| 3,614,744 | 10/1971 | Sweeney | 340/172.5 |
| 3,643,226 | 2/1972 | Loizides et al. | 340/172.5 |
| 3,676,851 | 7/1972 | Eastman | 340/172.5 |
| 3,733,589 | 5/1973 | Thompson | 340/172.5 X |

Primary Examiner—Mark E. Nusbaum
Attorney, Agent, or Firm—Wolder & Gross

[57] ABSTRACT

An information search system, includes a storage device in which, for example, words are alphabetically arranged, each word being coded by a number for each letter or character and a number corresponding to the order of each letter in the word. The letter code numbers of a word to be searched are successively fed into an input station whose output actuates a counter for a unit and is also coded into a corresponding letter number. Two pickups and associated registers read out and temporarily store the order number and letter number respectively and feed them to respective comparator networks to which are also fed the counter and encoder output respectively. Control networks are provided which respond to the comparator network outputs such that when the read out order number is greater or less than the counter output number the storage device is driven in a reverse or advance direction respectively and when the counter and order numbers are equal the order comparator network is actuated to drive the storage device in advance or return directions in accordance with the relationship of the read out and input letter codes until these numbers are equal.

3 Claims, 2 Drawing Figures

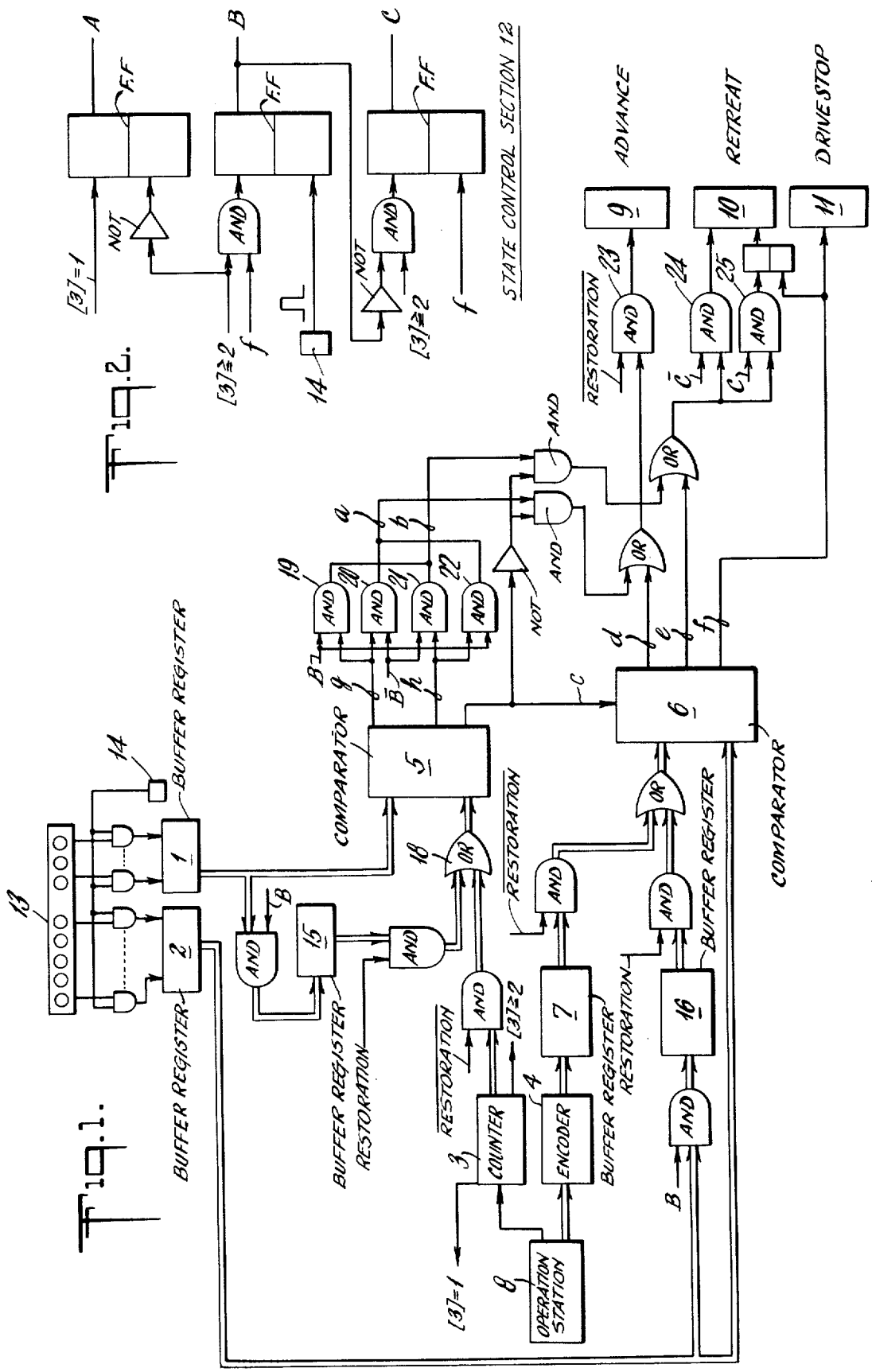

INFORMATION SEARCH SYSTEM

REFERENCE TO CO-PENDING APPLICATION

This is a Continuation-in-Part of U.S. patent application Ser. No. 495,601 filed Aug. 9, 1974, which in turn is a continuation of U.S. patent application Ser. No. 312,148 filed Dec. 4, 1972.

BACKGROUND OF THE INVENTION

The present invention relates to a method for addressing and searching a unit or word to be searched from an assembly of such units or words arranged in order of the Japanese syllabary or of the alphabet as catchwords in a dictionary.

In an attempt to form a dictionary or the like into a corresponding information file, for example, the file is generally characterized in that the code length necessary for memory of the head portion and the content portion of each word (i.e., each unit object to be searched) involves a large range of variation depending on the particular word. Therefore, memory spaces must be allotted and maintained in anticipation with due regard to such variation and these memory spaces are accordingly addressed to permit the search for the corresponding words. According to such a procedure, however, the memory spaces would be unreasonably large. The word itself, on the other hand, may be variable from one character word to a dozen character words and, therefore, the length of a word is variable. Additionally, character combinations follow no particular rule and the number of words are thus countless.

If the conventional procedure is employed to search the object as set forth above, a large number of bits will be necessary for a large number of words even when each word contained in a group of words (i.e., assembly of unit objects to be searched) is coded by a serial number indicating the order in which each word of said group of words is arranged. As a result, a large number of detector elements and processor mechanisms will be required and the code portion of the file will be large. Accordingly, the speed at which the object is detected or searched would be necessarily low in practical operation.

In addition to the problems set forth above in connection with the information capacity, there is another requirement that the device may establish or the operator may know what position in the assembly of arranged and coded unit words is occupied by a particular word. However, it would be difficult in view of the irregularity peculiar to the character combination of each word to realize the former and it would be impossible in view of limited human ability and large number of words contained in a dictionary or the like to realize the latter unless the address of said particular word to be searched is indicated by another dictionary. Here there would no longer be any efficiency of the mechanical search. It is demanded and desired, therefore, that the operation of search be achieved in such a manner that the elementary factors which form a word are successively put in the order of character combination particular to the word by operating members such as depression keys corresponding to 51 characters of the Japanese syllabary or 26 characters of the English alphabet. Although such mechanical input or reading out has been commonly employed in the information transfer system such as Telex, the information search would require a much more bulky structure of the device in view of the required memory capacity. With respect to combinations of the alphabet, for example, each of 26 alphabet characters may be coded by 5 bits so that 100 bits should be allotted for code marks of each word if the maximum length of a single word is given as the length of 20 characters. The device would be highly costly because of the large space required by the identification marks and the complexity of the detector elements and processing mechanisms.

To overcome the above disadvantages the present invention provides an improved method in which the number of bits which form code marks for identification or designation of unit objects to be searched (i.e. words) which are successively arranged may be substantially reduced by making the best use of the context in said successive arrangement.

FIGS. 1 and 2 are block diagrams of a preferred embodiment of the present invention.

Referring to the drawing, 1 designates a conventional buffer register consisting of flip-flops or the like adapted for temporary storage of numerical code marks contained in an elementary factor coding signal of a unit object to be searched (i.e., a word) which has been provided from a read out mechanism 13 and said numerical code marks indicate the order in which said elementary factors are combined. 2 designates another buffer register also consisting of flip-flops adapted for temporary storage of the elementary factor code marks contained in said elementary factor coding signal of said unit object to be searched (i.e., a word) provided from said read out mechanism 13. Transfer from the read out mechanism 13 to the buffer registers 1 and 2 is timed by signal provided from a read out synchronizer mechanism 14 which generates a synchronizing pulse to strobe data from 13 to the buffers 1 and 2.

15 and 16 designate buffer registers for return codes consisting of flip-flops or the like into which the read out codes from the buffer registers 1 and 2, respectively, are stored so as to be timed to a state B which will be mentioned later. The codes in these buffer registers 15 and 16 are arranged so that said codes serve as one input to respective one of binary value comparing means or magnitude comparators 5 and 6. Output of the register 1 is arranged so as to serve as one input to the binary value comparing means 5 while output of the other register 2 is arranged so as to serve as one input to the other binary value comparing means 6. 8 designates an operating station such as an input keyboard at which elementary factors (i.e., characters) of an intended word are successively addressed by depression of keys or the like in accordance with the order of elementary factor combinations and which includes depression keys or the like, such as those used for a typewriter. Output of said operating station 8 is arranged so that this output serves as the input to a binary counter 3 adapted to count the number of operations and the content of the addressed elementary factors (i.e., characters) is input through an encoder 4 to a register 7 consisting of flip-flops or the like. The encoder 4 produces signals representative of the character in binary form. For example, encoder 4 encodes the character as binary signals pursuant to the code specified in Table 2. The output terminal of counter 3 is arranged so as to serve as an input to AND gate 17 which serves as an input to OR gate 18 of the binary value comparing means 5 except during restoration at a state C which will be described more in detail later and the output of the register 7 is also arranged so as to serve as an input to the comparing means 6 except during the restoration at said state C.

The comparing means 5 and 6 are respectively provided at their outputs with out put terminals (g) and (d) adapted to be effective when the content of the register 1 or 2 takes a lower rank relative to the content of the other register, output terminals (h) and (e) adapted to be effective when the content of the register 1 or 2 takes a higher rank relative to the content of the other register and output terminals (c) and (f) adapted to be effective when the content of the register 1 or 2 takes a same rank relative to the other register, as a result of comparison of the inputs to the respective comparing means 5 and 6. These output terminals are connected through gates 19, 20, 21 and 22 to meet the requirements at various states which will be described more in detail later, a gate 23 adapted for a peculiarity encountered during the restoration and gates 24 and 25 for discrimination between the restoration and a normal retreat movement, respectively, to sections each consisting of a motor driver or the like to drive the object to be searched, namely, an advance drive section 9 and a retreat drive section 10, and a drive stopping section 11, respectively. That is, the devices 9, 10 and 11 may be devices that produce signals in response to an input signal from the associated AND gate to control the motor that drives the store or read-out mechanism 13. Thus, if the device 9 produces a signal the motor will move the store in the forward direction; if the device 10 produces a signal, the motor will be driven in the reverse direction; and a signal from the device 11 will stop the motor.

There is further provided a state control section 12 which may take three stages A, B and C. As seen from the previous description and the illustration by FIG. 1, the manner of input and output to and from the comparing means depends upon these three states. The states A, B and C are determined as shown by FIG. 2. It should be noted that the contents of the registers 1 and 2 are represented by [1] and [2], and the content of the counter 3 is represented by [3] for convenience of explanation.

The logic of operation in the state A is as follows:
if [1] > [3], the output (a) serves to advance the assembly;
if [1] < [3], the output (b) serves to return the assembly; and
if [1] = [3], the output (c) occurs.
When the output (c) occurs:
if [2] > [7], the output (e) serves to return the assembly;
if [2] < [7], the output (d) serves to advance the assembly; and
if [2] = [7], the output (f) serves to stop the assembly.

Return of the assembly in the state A continues until said assembly is stopped by the output (f).

The state B is the state in which the counter 3 is at $\overline{2}$ or above and reads the code of its operation starting point. The logic of the operation is as follows:
if [1] > [3], the output (b) serves to return the assembly;
if [1] < [3], the output (a) serves to advance the assembly; and
if [1] = [3], the output (c) occurs.
When the output (c) occurs:
if [2] > [7], the output (e) serves to return the assembly;
if [2] < [7], the output (d) serves to advance the assembly; and
if [2] = [7], the output (f) serves to stop the assembly.

The state C is the state in which the counter 3 is at $\overline{2}$ or above and reads the code of any position subsequent to its operation starting point. The logic of the operation in this state C is as follows:
if [1] > [3], the output (a) serves to advance the assembly;
if [1] < [3], the output (b) serves to return the assembly;
if [1] = [3], the output (c) occurs.
When the output (c) occurs:
if [2] > [7], the output (e) serves to return the assembly;
if [2] < [7], the output (d) serves to advance the assembly; and
if [2] = [7], the output (f) serves to stop the assembly.

It should be noted here that the return of the assembly in the state C is in the direction or restoration.

The manner in which the device according to the present invention operates is hereinafter described in connection with a search operation in an assembly of alphabetic words by way of example.

Information on a word read out by the read out mechanism 13 (for example, a magnetic head or the like associated with a magnetic tape on which information on objects to be searched is recorded) has a signal corresponding to the numerical portion of said information stored into the register 1 of three bit arrangement and another signal corresponding to the elementary factor (character) code portion of said information into the register 2 of five bit arrangement under striving effect of the signal from the read out synchronizing section 14. The information thus stored into these registers 1 and 2 is transmitted to the comparing means 5 and 6, respectively. It should be noted here that such transfer from the registers 1 and 2 to the registers 15 and 16 occurs only at the state B. From this state, the first character of the word to be searched is addressed by operation of the depression keys in the operating station 8. Upon this address, a signal representing the first operation input is applied to the counter 3 which, in turn, counts 1. The comparing means 5 compares the numerical signal previously applied from the register 1 with the numerical signal applied from the counter 3, and a result of this comparison is indicated by a signal output appearing on any one of the output terminals (g) (h) and (c).

On the other hand, character information of the operating station 8 is coded by the encoder 4 and transmitted through the register to the other comparing means 6 which, in turn, compares the information applied from said register 7 with the information previously applied from said register 2, and a result of this comparison is indicated by a signal output appearing on any one of the output terminals (d), (e), and (f).

The operation of comparison as explained above will be described more in detail in connection with an example in which an improved system of coding the objects to be searched is employed. The improved system which is employed in the device of the present invention is based on the principle that the identification code comprises a bit code indicating the position of a certain character contained in a series of characters combined to form a word relative to the position of the first character contained in the same series of characters and another bit code representing this character. The former may be referred to as the numerical code and the latter may be referred to as the numerical code and the later may be referred to as the elementary factor code. Thus, a word to be coded is compared to another word positioned immediately therebefore and, depending upon where the word to be coded contains an alphabetical character not common said another word, the position and the content of this particular character are coded, respectively. Assuming that words "gunfire", "gunman" "gunmetal", . . . are arranged in such an order, the word "gunman" is identical to the other word "gunfire" in the combined characters from the first to the third and a difference occurs at the fourth characters of these two words, that is, the fourth character in the word "gunman" is $m$ while the fourth character in the word "gunfire" is $f$. As the identification codes of the word "gunman" therefore, the bit code (e.g. 100) indicating the position (i.e., the fourth position) at which the difference occurs and the other bit code (e.g., 01101) representing $m$ are used.

On the assumption that the maximum length of a single word is the length of eight alphabetic characters in a dictionary file, Table 1 is a list of such numerical codes each indicating the position of a particular character, Table 2 is a list of such codes each representing a particular alphabetic character and Table 3 illustrates by way of example the manner of coding the words. In the explanation that follows, a character having a bar designation (i.e., $\overline{4n}$) indicates that the character is meant to be represented by binary notation pursuant to Tables 1 and 2. That is, the character $\overline{4n}$ means the character is to be thought of as being represented by the binary code 100 01110.

Table 1

| Position of a different character appearing first | Bit code |
|---|---|
| 1 | 001 |
| 2 | 010 |
| 3 | 011 |
| 4 | 100 |
| 5 | 101 |
| 6 | 110 |
| 7 | 111 |

Table 2

| a | 00001 | n | 01110 |
|---|---|---|---|
| b | 00010 | o | 01111 |
| c | 00011 | p | 10000 |
| d | 00100 | q | 10001 |
| e | 00101 | r | 10010 |
| f | 00110 | s | 10011 |
| g | 00111 | t | 10100 |
| h | 01000 | u | 10101 |
| i | 01001 | v | 10110 |
| j | 01010 | w | 10111 |
| k | 01011 | x | 11000 |
| l | 01100 | y | 11001 |
| m | 01101 | z | 11010 |

Table 3

| Code | | Word |
|---|---|---|
| 1 $\longrightarrow$ | 1 a | a |
| 2 $\longrightarrow$ | 2 a | aardvark |
| 3 $\longrightarrow$ | 2 b | aback |
| 4 $\longrightarrow$ | 5 u | abacus |
| 5 $\longrightarrow$ | 4 f | abaft |
| 6 $\longrightarrow$ | 4 l | abalone |
| 7 $\longrightarrow$ | 4 n | abandon |
| 8 $\longrightarrow$ | 4 s | abase |
| 9 $\longrightarrow$ | 5 h | abash |
| 10 $\longrightarrow$ | 4 t | abate |
| 11 $\longrightarrow$ | 5 i | abatis |
| 12 $\longrightarrow$ | 3 b | abbacy |
| 13 $\longrightarrow$ | 4 e | abbess |
| 14 $\longrightarrow$ | 5 y | abbey |
| 15 $\longrightarrow$ | 4 o | abbot |
| 16 $\longrightarrow$ | 4 r | abbreviate |
| 17 $\longrightarrow$ | 3 c | abc |
| 18 $\longrightarrow$ | 3 d | abdicate |
| 19 $\longrightarrow$ | 4 o | abdomen |

Now assuming that the word "abandon" as a unit object or word to be searched is searched by the device according to the present invention from the assembly of unit objects each coded as previously explained, the operation starts with addressing the character $\overline{a}$ at the operating station 8, thereby the counter 3 applies an output 001 corresponding to the first operation $\overline{1}$ to the comparing means 5 while the register 7 applies an output 00001 corresponding to $a$ to the comparing means 6.

On the other hand, the state control station 12 takes the state A since the counter 3 now takes $\overline{1}$. - The reading mechanism reads the code file of the assembly of unit objects to be searched (e.g., a magnetic tape, a microfilm, etc.) and said logic of operation in the state A is realized.

Assuming that the initial position is in the state 14 as in Table 3,

14 → [3] = T < $\overline{5}$ = advancement from [1].

15 → [3] = T < $\overline{4}$ = advancement from [1].

Thus, advancement continues until the state $\overline{1b}$ now not shown in Table 3, in which

[3] = T = T = [1] [2] = $b > a$ = [7].

Now return motion initiates and continues until the state $\overline{1a}$ is reached. This state is represented by 1 → in Table 3.

Then, $\overline{b}$ is addressed by the second operation at the operating station 8 and thereby the counter 3 now having counted up applies the code 010 of $\overline{2}$ to the comparing means 5. The comparing means 5 compares said code 010 with the code 001 of $\overline{1}$ in the previous state 1 → under the condition that the state control station 12 is in the state B, and applies the result of this comparison to the advancement control station 9 through the output terminal ($a$), advancing the file, since $\overline{1} < \overline{2}$. As the file is advanced, $\overline{2}$ of the state 2 → is read out at the numerical area 1 of the reading mechanism and, after coded, applied to the comparing means 5. When a coincidence is detected, the comparing means 5 applies a coincidence signal through the output terminal (c) to the other comparing means 6. At this moment the comparing means 6 detects the relationship $\overline{b} > \overline{a}$ from comparison of $\overline{a}$ of the state 2 → with the previous input $\overline{b}$ and activates the advancement control station 9 through the output terminal (d). As a result, the file advances to the state 3 → and, as this state 3 → is attained, both comparing means 5 and 6 coincide with each other, thus stopping the movement of the file with the coincidence signal as in the previous case.

Here $\overline{a}$ is addressed at the operating station 8 as the third operation and thereby the counter 3 produces the code signal of $\overline{3}$ which is a numerical signal, while the register 7 is applied with the code signal of $\overline{a}$. The $\overline{a}$ input by this operation is applied, as in the previous operation, to the comparing means 5 and 6 in form of $\overline{3a}$. The comparing means 5 compares $\overline{3}$ of $\overline{3a}$ with $\overline{2}$ of $\overline{2b}$ in the state 3 → under the condition that the state control station 12 is in the state B, and based on the result of this comparison the file is advanced. Although the comparing means 6 is adapted to compare $\overline{a}$ of $\overline{3a}$ with $\overline{b}$ of $\overline{2b}$, there is established a priority of comparing operation between the comparing means 5 and 6, for example, this priority is given to the comparison signal of the comparing means 5, and the three drive control stations 9, 10 and 11 are provided with means to prevent the associated control stations from simultaneously operating so that the file is advanced with an advancement command from the comparing means 5. As the state 4 → is attained, the state control station 12 transfers to the state C in which $\overline{5}$ of the read out signal $\overline{5a}$ in this state 4 → is compared by the comparing means 5 with that of said $\overline{3a}$ and, based on the $\overline{3}$ result of this comparison, that is $\overline{3} < \overline{5}$, the file is further advanced. Thus the state 5 → is attained in which the similar comparison is made and, as a result, the states 6 → , 7 → , . . . and 12 → are successively attained. In the last state 12 → , the file read out signal $\overline{3b}$ is compared with said input $\overline{3a}$ and based on the result of this comparison, that is, $\overline{3} - \overline{3}$ and $\overline{b} > \overline{a}$, the comparing means 5 applies the coincidence signal with respect to the numerical portion to the comparing means 6 through the output terminal (c). The comparing means 6, in turn, applies the input signal that takes a higher rank to the control station 10 through its output terminal (e).

As the state C is now attained, the gate 25 causes the restoration and the registers 15 and 16 which indicated the initial position are selected as one input to the respective comparing means 5 and 6. Retreat drive continues to the starting state 3 → at which the initial position codes coincide. Advancement drive is inhibited by the gate 23 during the restoration.

Then $\overline{n}$ input is effected by the operating station 8 as the fourth operation whereupon $\overline{4n}$ is produced by the counter 3 and the register 7 and compared with the file read out signal in the state 4 → under the condition established in the state B as in the previous operation. Based on $\overline{5} > \overline{4}$ given as a result of this comparison by the comparing means 5, the file advances and the state 5 → is attained. In the state 5 → , $\overline{4n}$ is compared with $\overline{4f}$ under the condition established in the state C and, as a result, the comparing means 5 applies the coincidence signal $\overline{4} = \overline{4}$. The drive control station is thus transferred to the state which is under control of the comparing means 6. The result of comparison made by the comparing means 6, that is $\overline{n} > \overline{f}$, instructs the file to be further advanced. Thus, the file further advances and the state 7 → is attained. As a result of comparison of the file read out signal $\overline{4n}$ in the state 7 → with the input $\overline{4n}$, both the comparing means 5 and 6 provide the coincidence signal so that the file is stopped under action of the drive stopping station 11.

Here $\overline{d}$ is input by the fifth operation at the operating station 8 whereupon $\overline{4s}$ in the state 8 → is compared with the input $\overline{5d}$ both in the comparing means 5 and 6 under the conditions of the state C and, based on the result $\overline{4} < \overline{5}$ the restoration signal is provided so that the file restores the state 7 → .

With $\overline{6o}$ of the sixth operation as well as with $\overline{7n}$ of the seventh operation, just as in the previous fifth operation, the file advances from the state 7 → and restores the state 7 → .

As a result of the above mentioned operation, it is shown that the state 7 → in which the file stops after successive input of all characters contained in the word "abandon" is in the position at which the word to be searched is addressed.

From the file thus addressed by the above mentioned searching operation, it is possible to obtain information record which is directly or indirectly addressed in association with the state of said file.

Although the aforegoing described operation has been made particularly in connection with a word to be searched which is composed of the alphabetic characters, it is obvious that such an operation may be effectively done also in reference with the other languages such as that composed of the Japanese syllabary. Furthermore, the device of the present invention may use the detector elements, registers, comparison circuits and the other devices of the prior art which are various and numerous. The device according to the present invention may apply to various manners of information recording, for example, to the manner in which, assuming that the content of an object to be searched is referred to as the primary information and the identification code of this object to be searched is referred to as the secondary information, the secondary information is placed at the head of each item of the primary information or only the secondary informations are assembled as the objects to be searched, so that the associated primary informations are correspondingly placed.

The system which is used by the device of the present invention to code the objects to be searched, as seen in Table 4 comprises the word code system composed of the numerical portion and the alphabetic portion. More specifically, a character contained in a word to be searched which appears first as a different character relative to the other word placed immediately before the word to be searched is coded with respect to the position and the content thereof. When such a software is employed, all the addressed objects cannot necessarily be attained. (In Table 4, for example, the word "abacus" may be attained as a result of addressing the word "aback".) Although sometimes only the adjacent words may be attained, such an operation of searching is sufficiently effective to achieve the purpose depending upon the content to be searched. Furthermore, the searching operation of this type is advantageous in that the searching operation is speeded up since no movement of restoration is involved.

Table 4

| 1 | a | a |
|---|---|---|
| 2 | a | aardvark |
| 2 | b | aback |
| 3 | a | abacus |
| 4 | f | abaff |
| 4 | l | abalone |
| 4 | n | abandon |
| 4 | s | abase |
| 5 | h | abash |
| 4 | t | abate |
| 5 | i | abatis |
| 3 | b | abbacy |

With the device of the present invention, as aforementioned, the searching operation is achieved by successive inputs such as the alphabets which are used to address the objects to be searched, so that the operation is extremely simplified and the time required for searching is shortened, since a catchword of the object to be searched can be used as the searching information signal. With the device of the present invention, moreover, the film cost may be reduced when microfilm or the like is used as the information recording medium since the space necessary for the catchword information may be small in the software used in the device according to the present invention. The device of the present invention also has the secondary advantage that the number of pickup lenses for the code marks of the catchword information located on a portion of the microfilm may be reduced because of relatively few contents of said catchword information. With the improved method of the present invention, addition or elimination of the objects to be searched which are recorded in the information file may be achieved in a simplified manner by changing only the content codes of the objects located next to the objects to be added or eliminated. The device itself of the present invention has advantages especially in searching into the information file in form of microfilm that a sufficient function of information searching is effected by an extremely simplified control circuit arrangement and that the position of the object to be searched may be attained via the path of the most efficient operation independently of the state of the information file from which searching operation is started.

I claim:

1. The method of operating a word data processing system for information searching comprising the steps of encoding each character of a word by assigning a character number representative of the particular character, and an order number representative of the position of each character in a word; storing the information so encoded in an information storage; sequentially entering into said system from an input word generator characters of a word to be searched; encoding each character to be searched as a first number representative of the character, and a second number representing the position of the character in the word to be searched; reading out the character and order number of a character at an output of said information storage; comparing the order number and character number of said output character with the respective first and second numbers of the character being searched; and driving said information storage to position the next adjacent word at said output until the second number is equal to the order number of the output character and the first number is equal to the character number of the output character, and repeating said comparing step for each such character comprising the word to be searched, said system comprising first and second comparator networks, and including the steps of feeding said order and second numbers to said first comparator network to produce first, second and third output signals when said order number is less than, greater than and equal to said second number respectively, driving said information storage in advance and reverse directions in response to said first and second signals respectively, feeding said character first number and third signal to said second comparator network to produce first, second and third output signals when said character number is less than, greater than or equal to said first number respectively, and driving said information storage in response to said second comparator first, second and third output signals in an advance and reverse direction and stopping said information storage drive respectively.

2. The method of claim 1, wherein said step for producing said second numbers comprises the entry of said letters of a word to be searched into a counter network which advances a unit in response to the entry of a letter.

3. A method for searching information comprising the steps of: driving an assembly of stored data elements through the sensing regions of two detector elements; each of said stored data segments comprising individual data elements arranged in a predetermined sequence; each of said data segments being encoded as a numerical code mark indicating the position of a particular data element in the associated data segment and a code mark representing the particular data element; respectively reading out the numerical code mark and the code mark of a data segment with said two detector elements during a search operation; sequentially introducing into an input station search data elements comprising the data segment to be searched by encoding such search data elements with a code indicating the position of the data element in the data segment and the particular data element; said code corresponding to the same code used in encoding said assembly of stored data segments; applying to a first comparator said numerical code marks of the stored and search data elements to produce first, second and third output signals when the position of said stored data element is less than, greater than and equal to the position of said search data element, respectively; driving said assembly of stored data elements in advance and reverse directions in response to said first and second signals, respectively; applying said search data element code mark and said third signal to a second comparator to produce first, second and third output signals when said stored data element code mark is less than, greater than and equal to said search data element code mark, respectively; and driving said assembly of stored data elements in response to said second comparator first, second and third output signals in an advance and a reverse direction and stopping said drive, respectively.

* * * * *